US009020982B2

(12) United States Patent
Wagner et al.

(10) Patent No.: US 9,020,982 B2
(45) Date of Patent: Apr. 28, 2015

(54) DETECTION OF PLANAR TARGETS UNDER STEEP ANGLES

(71) Applicant: QUALCOMM Incorporated, San Diego, CA (US)

(72) Inventors: Daniel Wagner, Vienna (AT); Slawomir K. Grzechnik, San Diego, CA (US); Qi Pan, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 13/793,629

(22) Filed: Mar. 11, 2013

(65) Prior Publication Data
US 2014/0108466 A1    Apr. 17, 2014

Related U.S. Application Data

(60) Provisional application No. 61/714,115, filed on Oct. 15, 2012.

(51) Int. Cl.
*G06F 17/30* (2006.01)
*G06K 9/32* (2006.01)
*G06K 9/46* (2006.01)

(52) U.S. Cl.
CPC ........ *G06K 9/3241* (2013.01); *G06F 17/30244* (2013.01); *G06K 9/4671* (2013.01)

(58) Field of Classification Search
CPC ........... G06F 17/30244; G06K 9/3241; G06K 9/4671
USPC .................. 707/802–803, 812; 382/128, 154; 358/1.1; 33/203.18; 264/401
See application file for complete search history.

(56) References Cited

U.S. PATENT DOCUMENTS

| 5,260,009 A * | 11/1993 | Penn .............................. 264/401 |
| 6,134,792 A * | 10/2000 | January ..................... 33/203.18 |
| 6,175,422 B1 * | 1/2001 | Penn et al. ..................... 358/1.1 |
| 6,763,148 B1 | 7/2004 | Sternberg et al. |
| 7,613,357 B2 | 11/2009 | Owechko et al. |
| 7,643,683 B2 | 1/2010 | Miller |
| 7,831,094 B2 | 11/2010 | Gupta et al. |
| 8,224,127 B2 | 7/2012 | Woodard et al. |

(Continued)

OTHER PUBLICATIONS

Cozar, J.R., et al., "Detection of arbitrary planar shapes with 3D pose", Image and Vision Computing Elsevier Netherlands, vol. 19, No. 14, Dec. 1, 2001, pp. 1057-1070, XP002718183, ISSN: 0262-8856.

(Continued)

*Primary Examiner* — Frantz Coby
(74) *Attorney, Agent, or Firm* — Silicon Valley Patent Group LLP

(57) ABSTRACT

Systems, apparatus and methods to create a database by a device (such as a server) and to use the database by a mobile device for detecting a planar target are presented. The database allows recognition of a planar target by a mobile device from steeper angles with minimum impact on runtime. The database is created from at least one warped view of the planar target. For example, a database may contain keypoints and descriptors from a non-warped view and also from one or more warped views. The database may be pruned by removing keypoints and corresponding descriptors of one image (e.g., a warped image) overlapping with similar or identical keypoints and descriptors of another image (e.g., a non-warped image).

38 Claims, 12 Drawing Sheets

(56) References Cited

U.S. PATENT DOCUMENTS

| | | | |
|---|---|---|---|
| 8,526,690 B2* | 9/2013 | Kitamura | 382/128 |
| 8,687,920 B2* | 4/2014 | Morel et al. | 382/296 |
| 2011/0286631 A1* | 11/2011 | Wagner et al. | 382/103 |
| 2014/0233847 A1* | 8/2014 | Ratcliff et al. | 382/154 |

OTHER PUBLICATIONS

International Search Report and Written Opinion—PCT/US2013/060361—ISA/EPO—Jan. 8, 2014.

Kurz, et al. "Inertial sensor-aligned visual feature descriptors," In Proc. IEEE Conference on Computer Vision and Pattern Recognition (CVPR2011), pp. 161-166, Colorado Springs, USA, 2011.

Beymer, et al., "Face Recognition From One Example View", Massachusetts Institute of Technology Artificial Intelligence Laboratory, A.I. Memo No. 1536, Sep. 1995, 21pgs.

Morel, J.-M., et al., "ASIFT: A New Framework for Fully Affine Invariant Image Comparison," SIAM Journal on Imaging Sciences, vol. 2, No. 2, pp. 438-469, 2009.

Baheti, P.K., et al., "Information-theoretic database building and querying for mobile Augmented Reality applications," IEEE/ACM International Symposium on Mixed and Augmented Reality, Science and Technolgy Proceedings, pp. 47-53, Oct. 26-29, 2011.

* cited by examiner

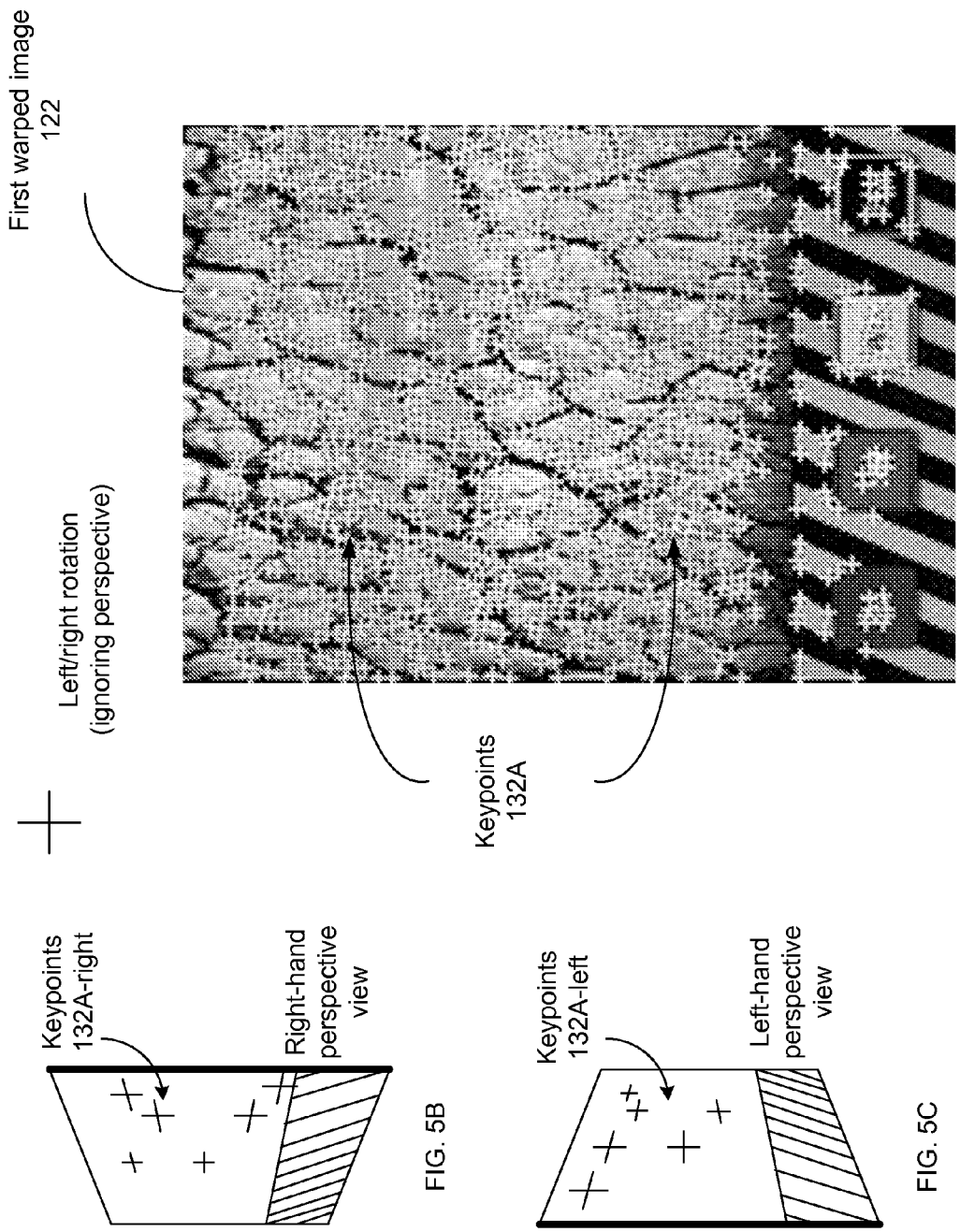

DETECTION OF PLANAR TARGETS UNDER STEEP ANGLES

CROSS-REFERENCE TO RELATED APPLICATIONS

This application claims the benefit of and priority under 35 U.S.C. §119(e) to U.S. Provisional Application No. 61/714,115, filed Oct. 15, 2012, titled "Detection of planar targets under steep angles" and which is incorporated herein by reference in its entirety.

BACKGROUND

I. Field of the Invention

This disclosure relates generally to systems, apparatus and methods for augmented reality (AR), and more particularly to allowing recognition of a planar target from steep angles with minimum impact on runtime.

II. Background

In augmented reality (AR) applications, most planar object detection systems compare descriptors of a picture of a planar object (e.g., taken by a user with a mobile phone camera) against a database of descriptors created offline. First, planar target (sometimes referred to as a reference target, reference image, planar image, planar target image, planar reference image, rectified image, and the like) is presented. Next, a processor detects keypoints 130 (e.g., a corner or edge feature, generally called a feature point) on the planar target. The processor then determines a descriptor around each of the keypoints 130. A descriptor may be represented as a vector (e.g., having 32, 64 or 128 dimensions) that describes a visual appearance of around a certain keypoint of the planar object. A keypoint 130 along with its descriptor may be referred to as a feature. A plurality of keypoints 130 along with its corresponding plurality of descriptors may be referred to as a plurality of features for a target image. The processor stores the features representing the planar target along with descriptors of other planar targets in a database. A mobile device can then compare descriptors found in a camera image to the database of descriptors to match or detect the planar target and thereby know which planar target is in the camera's view and from which viewpoint the planar target in the database is being observed.

Descriptors are designed to have certain attractive properties. Ideally descriptors would be fully lighting and viewpoint invariant. While lighting, scale and in-plane rotation invariances are adequately handled by modern descriptors, strong out-of-plane rotation is still an issue. What is needed is a systems, apparatus and methods in an augmented reality (AR) system that allows recognition of a planar target from steep angles with minimum impact on runtime, by comparing and matching descriptors both efficiently (e.g., using dot products) and effectively (e.g., at least partially invariant to viewpoint and lighting changes).

BRIEF SUMMARY

Disclosed are systems, apparatus and methods for detecting a planar target both more efficiently and effectively.

According to some aspects, disclosed is a method to create a database used for detecting a planar target, the method comprising: receiving an image of the planar target having a reference coordinate system; processing the image of the planar target, wherein processing comprises: detecting a plurality of keypoints in the planar target; and determining a descriptor around each of the plurality of keypoints in the planar target, thereby resulting in the plurality of keypoints and corresponding descriptors of the image of the planar target; processing a first warped image, wherein processing comprises: warping the planar target to form the first warped image having a first warped coordinate system; detecting a plurality of keypoints in the first warped image; determining a descriptor around each of the plurality of keypoints of the first warped image, thereby resulting in the plurality of keypoints and corresponding descriptors of the first warped image; and transforming coordinates of the plurality of keypoints of the first warped image between the first warped coordinate system and the reference coordinate system; and joining at least some of the plurality of keypoints and the corresponding descriptors of the first warped image with at least some of the plurality of keypoints and the corresponding descriptors of the planar target to form a single dataset in the database for the image of the planar target.

According to some aspects, disclosed is a device to create a database for use by a mobile device to detect a planar target, the device comprising: a camera configured to capture an image having a reference coordinate system, wherein of the image contains the planar target; a processor coupled to the camera and configured to: process the image of the planar target, wherein the processor is configured to: detect a plurality of keypoints in the planar target; and determine a descriptor around each of the plurality of keypoints in the planar target, thereby resulting in the plurality of keypoints and corresponding descriptors of the image of the planar target; process a first warped image, wherein the processor is configured to: warp the planar target to form the first warped image having a first warped coordinate system; detect a plurality of keypoints in the first warped image; determine a descriptor around each of the plurality of keypoints of the first warped image, thereby resulting in the plurality of keypoints and corresponding descriptors of the first warped image; and transform coordinates of the plurality of keypoints of the first warped image between the first warped coordinate system and the reference coordinate system; and join at least some of the plurality of keypoints and the corresponding descriptors of the first warped image with at least some of the plurality of keypoints and the corresponding descriptors of the planar target to form a single dataset in the database for the image of the planar target.

According to some aspects, disclosed is a device to create a database for use by a mobile device to detect a planar target, the device comprising: means for receiving an image of the planar target having a reference coordinate system; means for processing the image of the planar target, wherein processing comprises: means for detecting a plurality of keypoints in the planar target; and means for determining a descriptor around each of the plurality of keypoints in the planar target, thereby resulting in the plurality of keypoints and corresponding descriptors of the image of the planar target; means for processing a first warped image, wherein processing comprises: means for warping the planar target to form the first warped image having a first warped coordinate system; means for detecting a plurality of keypoints in the first warped image; means for determining a descriptor around each of the plurality of keypoints of the first warped image, thereby resulting in the plurality of keypoints and corresponding descriptors of the first warped image; and means for transforming coordinates of the plurality of keypoints of the first warped image between the first warped coordinate system and the reference coordinate system; and means for joining at least some of the plurality of keypoints and the corresponding descriptors of the first warped image with at least some of the plurality of keypoints and the corresponding descriptors of the planar target to form a single dataset in the database for the image of the planar target.

According to some aspects, disclosed is a non-transitory computer-readable storage medium including program code stored thereon for a device to create a database for use by a mobile device to detect a planar target, comprising program code to: receive an image of the planar target having a reference coordinate system; process the image of the planar target, wherein the program code to process comprises program code to: detect a plurality of keypoints in the planar target; and determine a descriptor around each of the plurality of keypoints in the planar target, thereby resulting in the plurality of keypoints and corresponding descriptors of the image of the planar target; process a first warped image, wherein the program code to process comprises program code to: warp the planar target to form the first warped image having a first warped coordinate system; detect a plurality of keypoints in the first warped image; determine a descriptor around each of the plurality of keypoints of the first warped image, thereby resulting in the plurality of keypoints and corresponding descriptors of the first warped image; and transform coordinates of the plurality of keypoints of the first warped image between the first warped coordinate system and the reference coordinate system; and join at least some of the plurality of keypoints and the corresponding descriptors of the first warped image with at least some of the plurality of keypoints and the corresponding descriptors of the planar target to form a single dataset in the database for the image of the planar target.

According to some aspects, disclosed is a method in a mobile device for detecting a planar target, the method comprising: capturing an image of the planar target at an acute angle to form a captured image, wherein the acute angle is measured from a perpendicular line from a plane of the planar target; detecting a plurality of keypoints from the captured image; determining a descriptor around each of the plurality of keypoints, thereby forming a plurality of descriptors from the captured image; comparing the plurality of descriptors from the captured image to a database containing a plurality of descriptors for at least one warped image of a non-warped image to result in a comparison; and recognizing the planar target from the comparison.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

FIGS. 4 and 5A-5C illustrate examples of warping a planar target, in accordance with some embodiments of the present invention.

FIGS. 6-9 show various warped images derived from a planar target, in accordance with some embodiments of the present invention.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
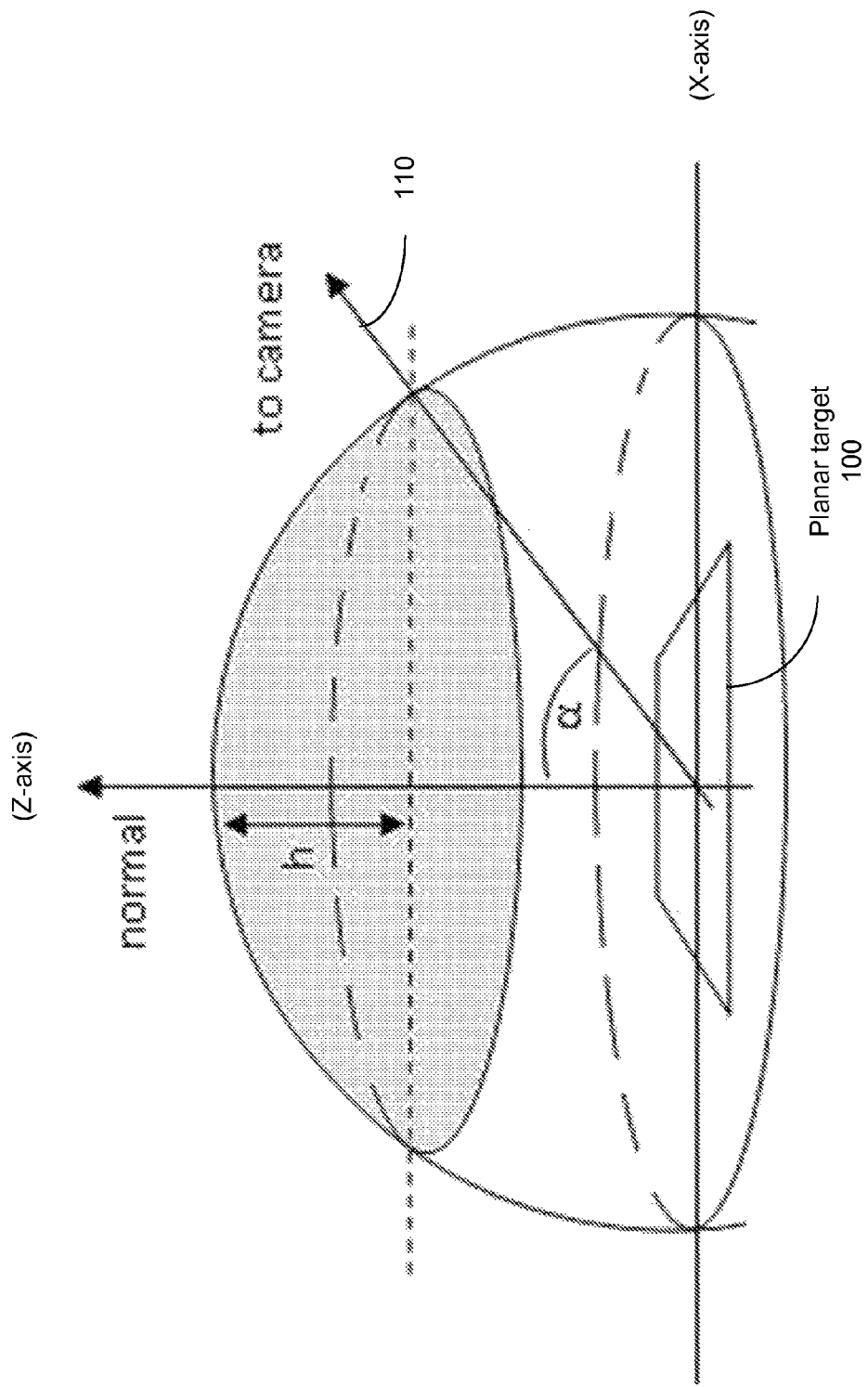
FIG. 1 defines an acute angle α with respect to a planar target.

FIG. 1 defines an acute angle α with respect to a planar target 100. In a Cartesian coordinate system with X, Y and Z-axes, a planar target 100 is shown in the X-Y plane. An out-of-plane rotation angle α is defined as an angle between a line 110 along a camera field of view (i.e., a line normal to the camera lenses) and a line normal to the planar target 100, shown as the Z-axis.

An image is non-warped if the out-of-plane rotation angle α is zero degrees (0°). An image is warped if the out-of-plane rotation angle α is larger than 0°. That is, the planar target 100, if presented as a top-down view, remains having its original non-warped dimensions. An image may be considered non-warped when the out-of-plane rotation angle α is very small (e.g., less than 5°, 10° or 15°). During pre-processing, a number of keypoints 130 and descriptors are derived for the top-down view of the planar target 100. The planar target 100 is synthesized as a warped image by rotating the out-of-plane rotation angle α between the target image and the camera at a non-zero angle α (e.g., between 50° and 65°, such as 60°) about one or more axes from the Z-axis.

Perspective projection may or may not be used to project the rotated planar target. When perspective projection is used the front of the planar target 100 appears to become larger while the back of the planar target 100 appears to become smaller such that a square planar target becomes a trapezoidal warped image (e.g, when using a perspective projection). Instead of using the perspective projection, an orthographic projection is used to combine common views and to save memory. With the orthographic projection, the front and back of the image do not change in relative size. As such, a square planar target becomes parallelogram in the warped image. Warping using orthographic projection is referred to as affine warping, which preserves straight lines. Affine warping allows a reduction of the number warped views of the planar target because results of left and right rotations produce identical warped images and the same occurs with up and down rotations. Therefore, the common views are combined into a single view.

Multiple different warped images may be formed by rotating the target image about various axes. Again during pre-processing, another number of keypoints 132 (e.g., 132A, 132B, 132C, 132D from FIGS. 6-9, respectively) and descriptors are derived for each of the resulting warped views. As long as angle α is small (e.g., less than 20° or 30°), the induced warping is small and derived keypoints 132 and descriptors are similar enough to match the keypoints 130 and descriptors of the non-warped target image. As α grows, however, an increasingly different set of keypoints 132 and descriptors are derived for the increasingly warped views up to a point where resulting descriptor of an extremely warped view (e.g., from steep angle such as an angle more than 60°) no longer adequately match the descriptor derived from the target view.

Previously, a database was formed with only descriptors from one or more non-warped target images, however, the database did not adequately represent descriptors detected in camera images taken of a target image at a steep angle (e.g., at an acute angle between 65° and 70° or between 70° and 75°). In accordance with some embodiments of the present invention, a database includes descriptor of one or more warped target images, such as a synthetically warped image with or without changing or including a perspective view. The database may contain keypoints and descriptors of warped image warped or rotated by an angle α between 5° and 35°, between 35° and 45°, between 45° and 55°, and/or between 55° and 75°.

A database with descriptors of warped images appears to a mobile device just as a database with non-warped images. In some embodiments, a database includes only descriptors of one or more warped target images and no descriptor from the original, non-warped target image. In some embodiments, a database includes descriptors of one or more warped target images and of the original, non-warped target image. In any case, a mobile device using the database does not need to know that the database was created with or without warped images. However, if the database was created with one or more warped images, a mobile device will be able to find more descriptors in the database corresponding to an image taken at higher slanted or acute camera angles. Thus, the database may allow a mobile device to more robustly match and recognize objects captured at higher acute angles.

Figure 2:
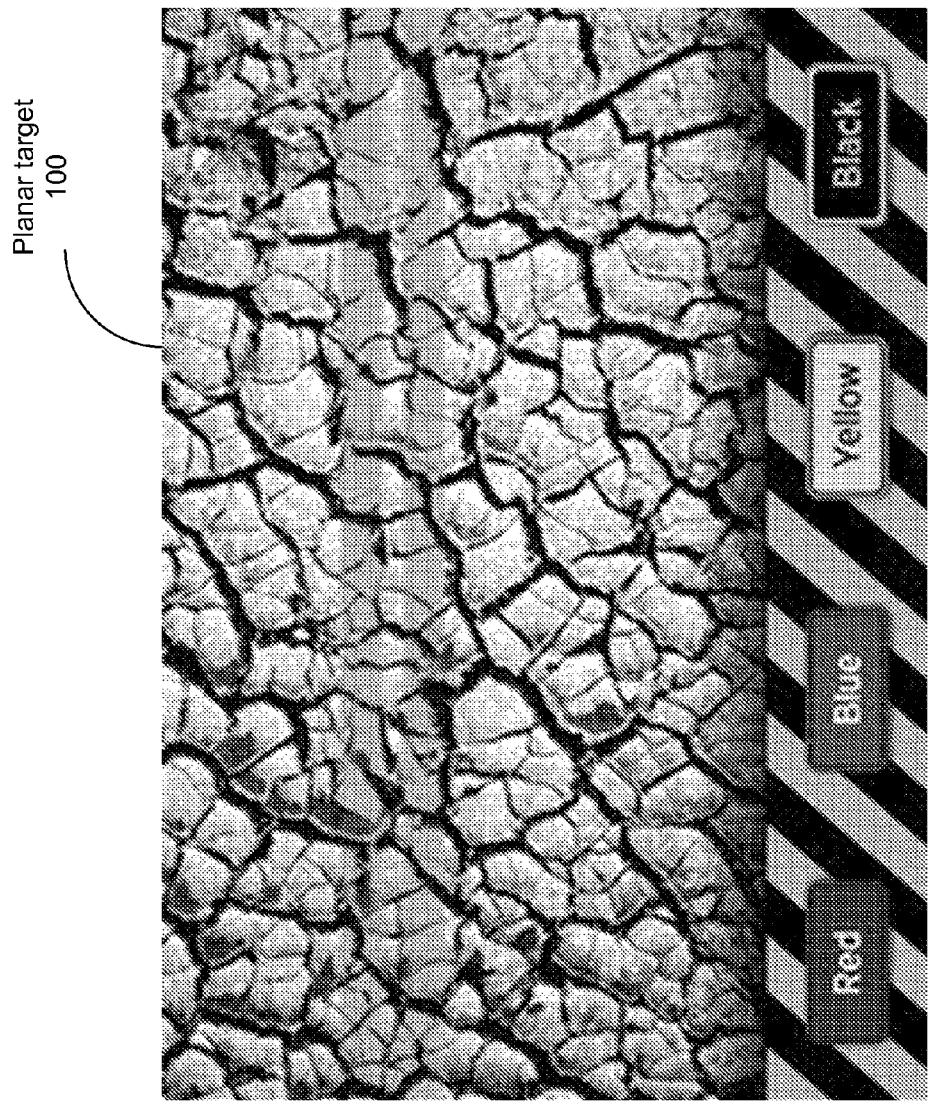
FIGS. 2 and 3 show a planar target, in accordance with some embodiments of the present invention.
Figure 3:
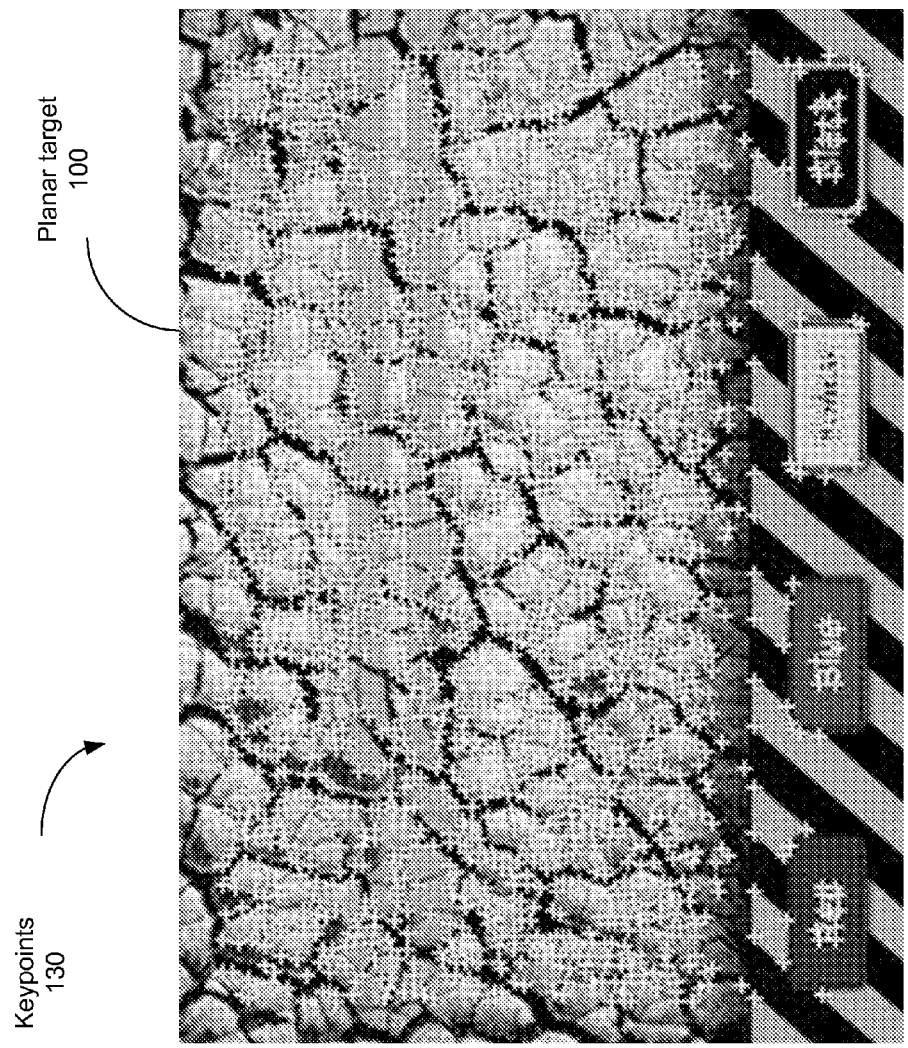

FIGS. 2 and 3 show a planar target 100, in accordance with some embodiments of the present invention. In FIG. 2, top-down view of a planar target 100 from angle α of 0°. A good planar target 100 contains random graphics (i.e., without a repetitive pattern) with a well distributed set but randomly positioned keypoints 130. In FIG. 3, a set of keypoints 130 of the same planar target 100 are shown separately as crosshairs. The keypoints 130 are both well distributed and randomly distributed.

Figure 4:
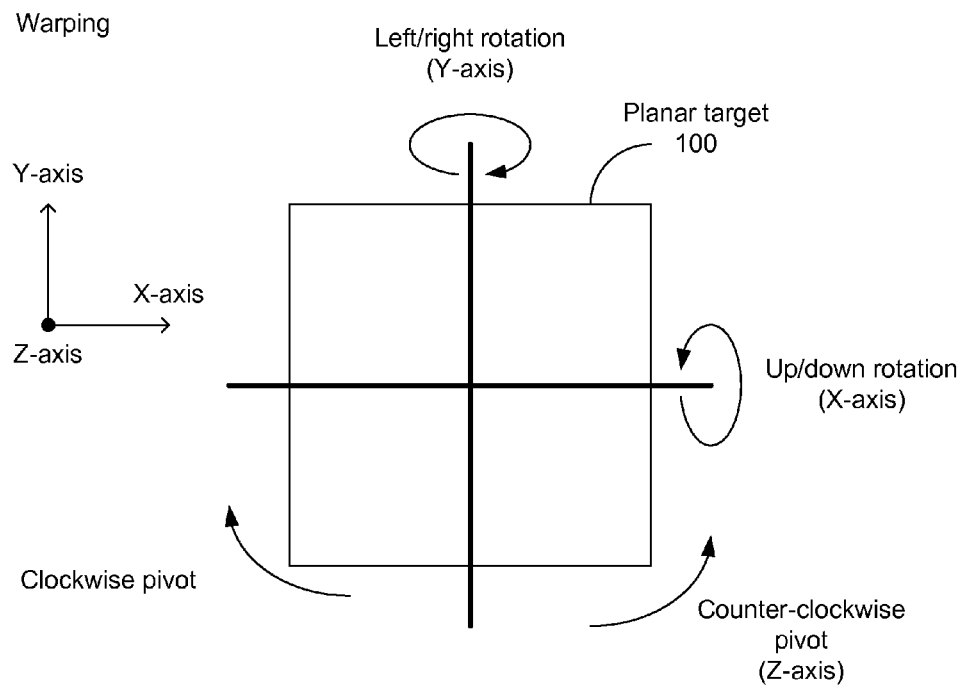

FIGS. 4 and 5A-5C illustrate examples of warping a planar target 100, in accordance with some embodiments of the present invention. In FIG. 4, a planar target 100 in the X-Y planes is shown with axes of rotation about the X, Y and Z-axes. A planar target 100 may be warped by rotating it a fixed number of degrees about one or two axes. For example, a warped image may be formed by rotating a planar target 100 about an X-axis resulting in an up/down rotation. A warped image may be formed by rotating a planar target 100 about a Y-axis resulting in a left/right rotation. A warped image may be formed by rotating a planar target 100 about both the X-axis and the Y-axis. Furthermore, a warped image may be formed by rotating a planar target 100 about the X-axis and/or the Y-axis and the Z-axis, thus rotating the resulting image about a pivot point in a clockwise or counter-clockwise direction. The rotation may include using a perspective projection where a front of the rotated image is larger and a more distant of the rotated image appears smaller. Alternatively, perspective may be excluded such that perspective is not accounted for in the warped image by affine warping using an orthographic projection. A warped image may be created with a physical image and actual camera. Alternatively, a warped image may be created by a mathematical transform or mathematically rotating to include or exclude perspective effects.

Figure 5A:
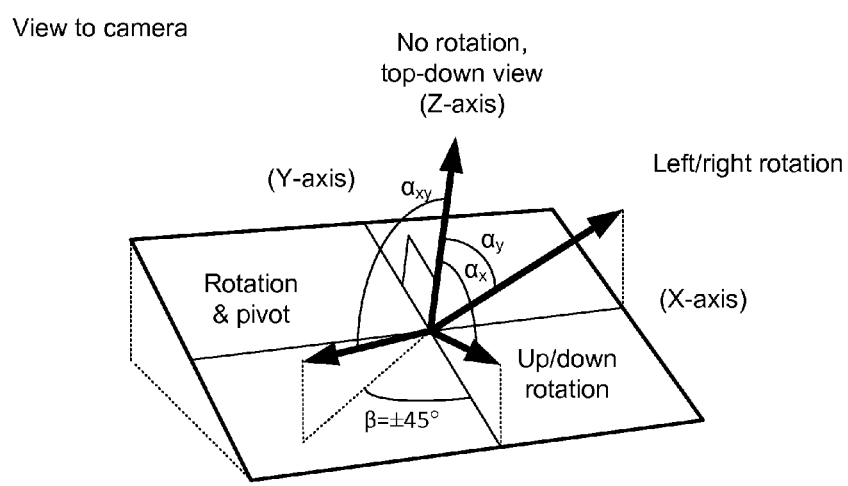

In FIG. 5A, an original planar target 100 and various synthesized views to an imaginary camera are shown. A left/right rotation about the Y-axis by an angle $α_y$ results in a first warped image. An up/down rotation about the X-axis by an angle $α_x$ results in a second warped image. A rotation (e.g., by $α_{xy}$=60° about either the X or Y-axis) and pivot (e.g., by β=±45° about the Z-axis) results in a third warped image.

If perspective is considered by using a perspective view, as many as twice as many keypoints 132 for a warped image need to be processed. As shown in FIG. 5B, one set of keypoints 132A-right (where the term "right" represents a right-hand perspective view) and corresponding descriptors may result from a right rotation. As shown in FIG. 5C, another set of keypoints 132A-left (where the term "left" represents a left-hand perspective view) and corresponding descriptors may result from a left rotation. Keypoints 132 (e.g., keypoints 132A as shown in FIG. 6) may be detected and corresponding descriptors computed from each of the warped images. The right-hand perspective image and the left-hand perspective image were created by rotations about the Y-axis. Similarly, an upper perspective image and the lower perspective image may be created by rotations about the X-axis.

Each view, whether perspective is included or not, provides a set of keypoints and a corresponding descriptor for each keypoint. A database may include a full set or a pruned set of descriptors from each warped image. In either case (without or showing perspective), pruning the descriptors found in the database may result in a faster runtime for a mobile device's camera and processor to match a planar image.

In some embodiments, a database is formed from keypoints and descriptors (where a keypoint and a corresponding descriptor may be referred to as a feature) from various images. A database without embodying the present invention includes just features from an original, non-warped image. A database with embodiments the present invention include features from at least one warped or perspective-view image.

A database may be formed with an original, non-warped image and one, two, three, four or more warped images. The warped images may be with or without considering perspective. Alternatively, a database may be formed without an original, non-warped image but with one, two, three, four or more warped images. For example, a database may contain a plurality of features, which have been pruned or not pruned, from four images: (1) a left-hand perspective view; (2) a right-hand perspective view; (3) an upper perspective view; and (4) a downward perspective view. A database may contain a plurality of features from three images: (1) an original, non-warped image; (2) a non-perspective view rotated about the X-axis; and (3) a non-perspective view rotated about the Y-axis. A database may contain a plurality of features from five images: (1) an original, non-warped image; (2) a non-perspective view rotated about the X-axis ($α_x$=20°); (3) a non-perspective view rotated about the X-axis ($α_x$=45°); (4) a non-perspective view rotated about the Y-axis ($α_y$=45°); and (5) a non-perspective view rotated about the Y-axis ($α_y$=45°). A database may contain a plurality of features from just images: (1) an original, non-warped image; and (2) a non-perspective affine view rotated about the X-axis or Y-axis. Other combinations of images are possible.

A database may include as few as two non-warped and warped images or just one warped image. An image from perpendicular angle ($α_x$=$α_y$=0° from FIG. 5A) from the target image is considered an original, non-warped image. With perspective warping using a perspective projection, an original image may also be considered from this top-down view such that edges are curved rather than forming a rectangle for a rectangular target image. A warped image may be synthesized at an angle off from perpendicular at a predetermined angle (e.g., α=10°, 20°, 30° or 40°).

A database may include a plurality of databases of images described above. For example, a database may include non-warped and warped images for a first target image and also include non-warped and warped images for a second target image.

A database may be in a single reference system. For example, the reference system of an original, non-warped image may be used as a common reference system used to represent both non-warped and warped images.

FIGS. 6-9 show various warped images 120 derived from a planar target 100, in accordance with some embodiments of the present invention. The planar target 100 has a reference coordinate system (e.g., in the X-Y plane) and a set of determined keypoints 130. In the following figures, perspective has been ignored by using affine warping. In FIG. 6, the planar target 100 has been rotated in a left/right direction about a Y-axis resulting in a warping of the planar target 100 to form a first warped image 122. The first warped image 122 has a first warped coordinate system. Keypoints 132A are detected using this first warped image 122 then corresponding descriptors are determined from the keypoints 132A. When perspective is ignored by using an orthographic projection, the first warped image 122 is created mathematically. Also, since perspective is ignored when warping a planar target 100, the first warped image 122 appears thinner with parallel sides. If perspective was not ignored by using a perspective projection, the first warped image 122 would appear as a trapezoid with two parallel sides and two non-parallel sides.

Figure 7:
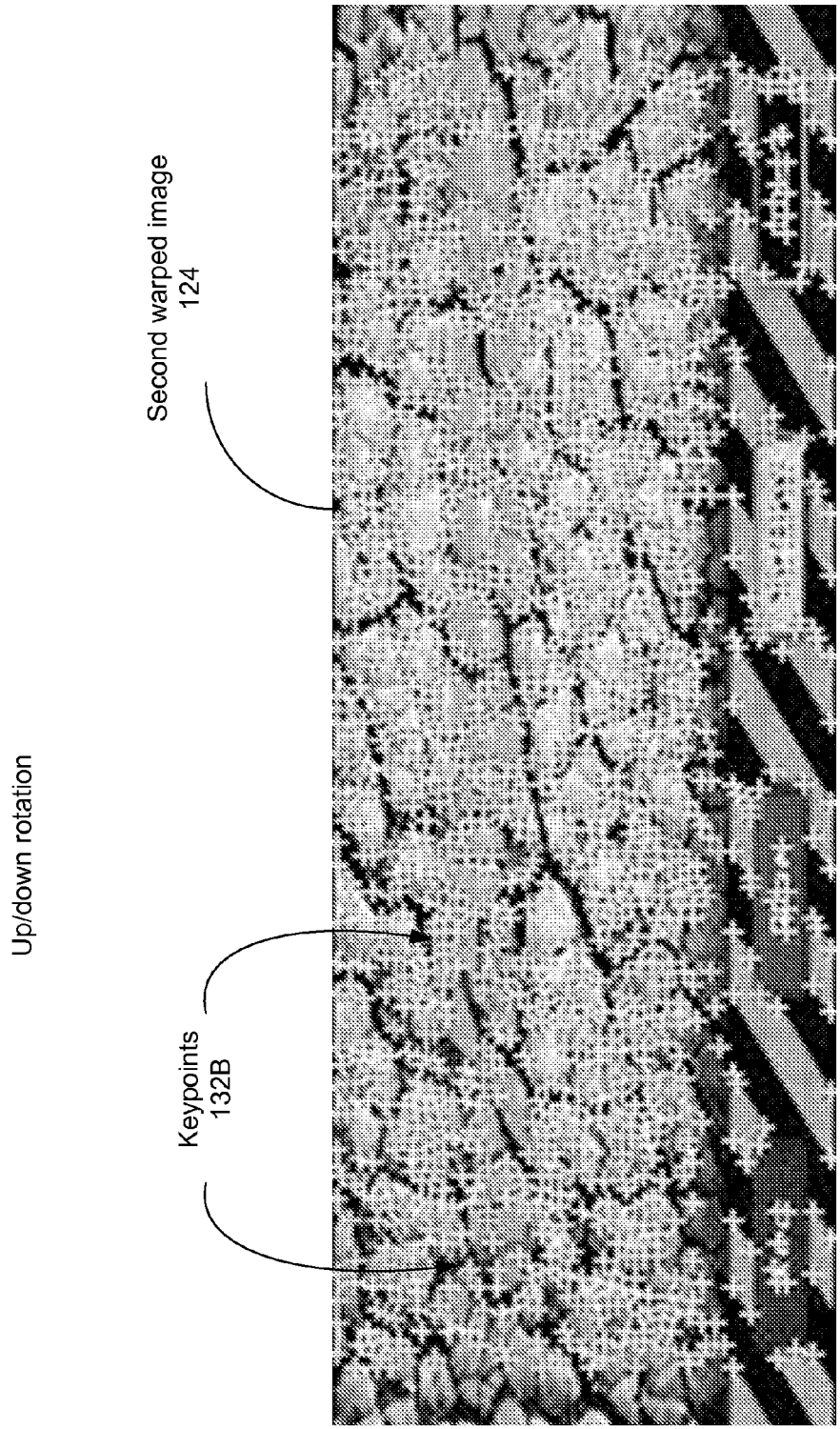

In FIG. 7, the planar target 100 has been mathematically rotated in an up/down direction about an X-axis resulting in a warping of the planar target 100 to form the second warped image 124 having a second warped coordinate system. Again, keypoints 132B are detected then corresponding descriptors are determined for the second warped image 124. Since perspective is ignored in the mathematical transformation using an orthographic projection, the second warped image 124 appears flatter with four parallel sides. Again, if perspective was not ignored, the second warped image 124 would appear as a trapezoid with two parallel sides and two non-parallel sides.

Figure 8:
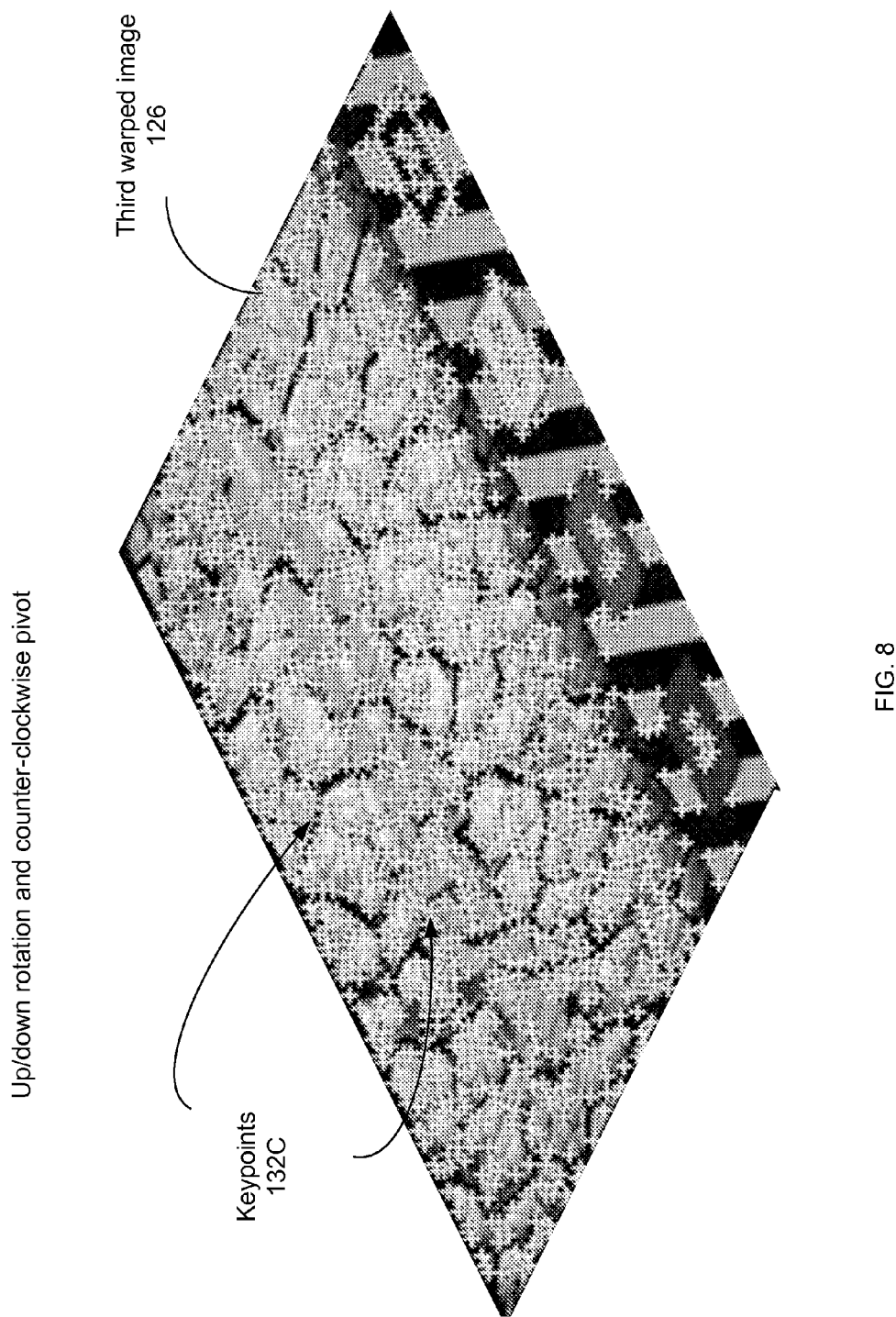

In FIG. 8, the planar target 100 has been mathematically rotated counter-clockwise about the Z-axis at a center point and in an up/down direction about an X-axis to form the third warped image 126 having a third warped coordinate system. The keypoints 132C are detected then corresponding descriptors are determined for the third warped image 126. Here, opposite sides of the third warped image 126 are parallel to each other but not necessarily at right angles to adjacent sides.

Figure 9:
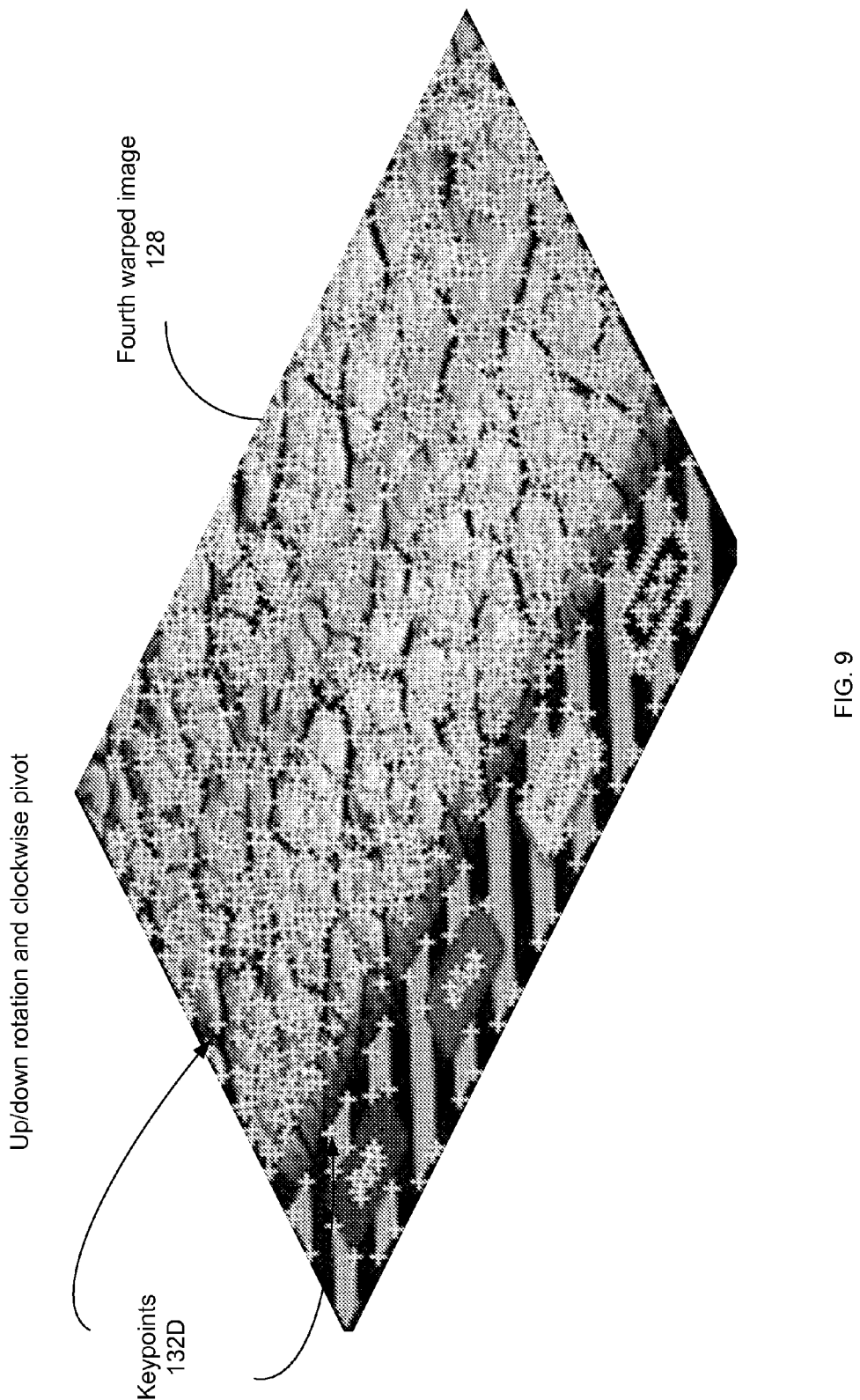

In FIG. 9 the planar target 100 has been rotated clockwise about the Z-axis at a center point and in an up/down direction about an X-axis to form the fourth warped image 128 having a fourth warped coordinate system. Again, the keypoints 132D are detected and descriptors are determined for the fourth warped image 128.

Up to this point, pre-processing has been discussed. Mathematical transformations may be used to create the previous warped images. From the transformed warped images, keypoints are determined. The set of keypoints may be paired down to a reduced number, such as a well distributed and randomly distributed set of keypoints. For all or several keypoints, a descriptor representing the keypoint may be determined. These keypoints and corresponding descriptors may be saved as features in a database. This pre-processing may be performed at a server or other device.

Now on-device use is considered. On-device use occurs as a result of a mobile device capturing an actual image of a planar target 100. In these captured images, a prospective view is captured as shown in the following figures.

Figure 10:
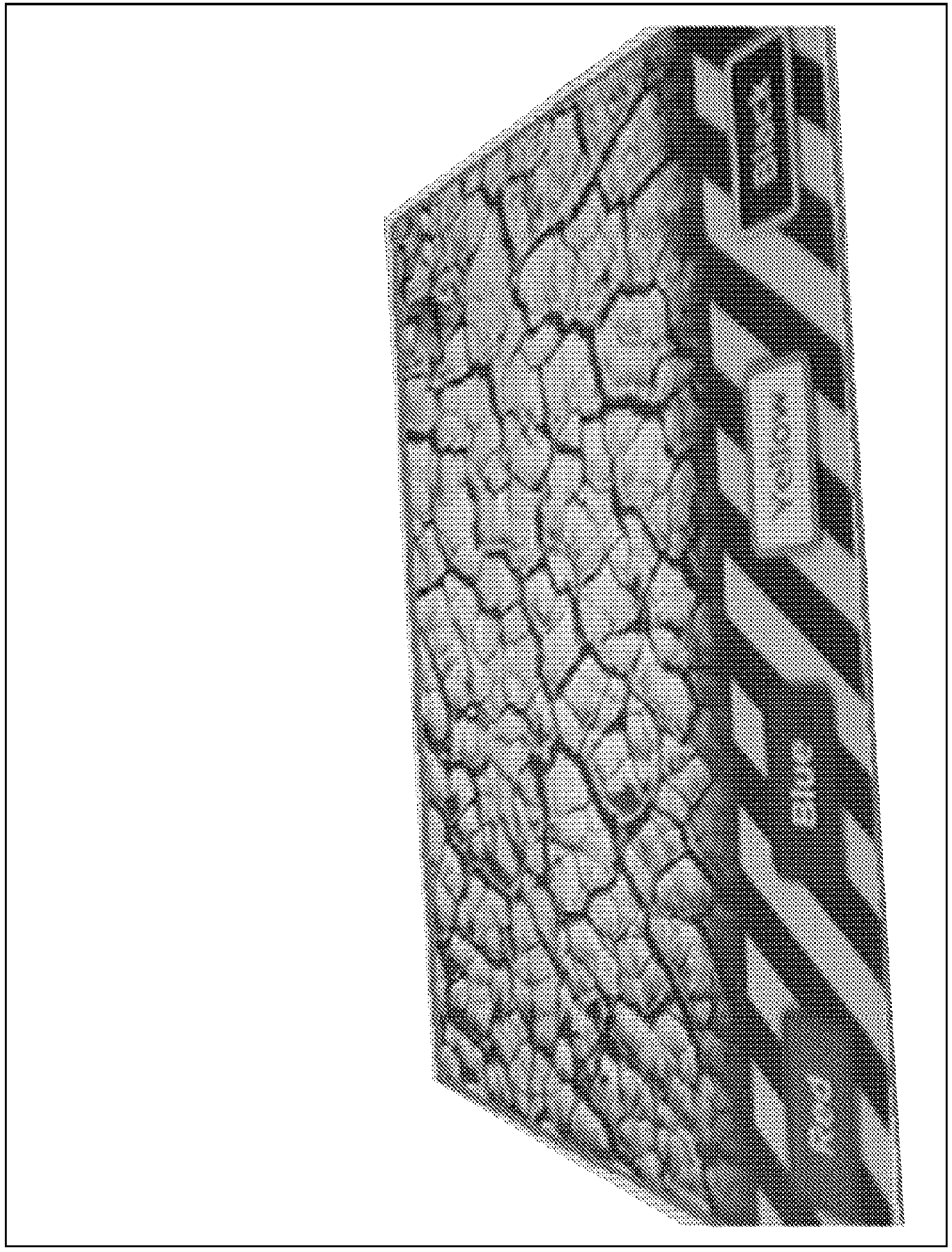
FIGS. 10-12 show a planar target at various steep angles of incidence as viewed from a camera.
Figure 11:
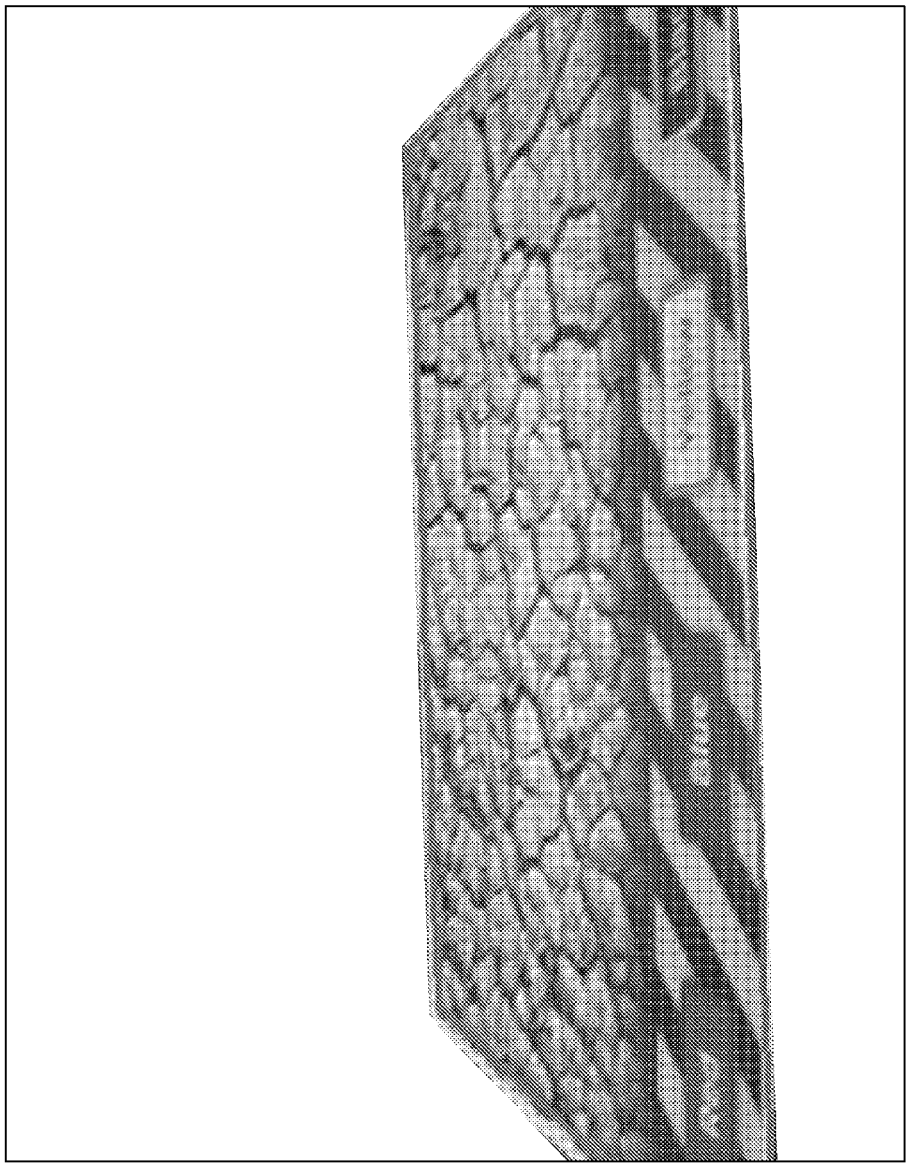
Figure 12:
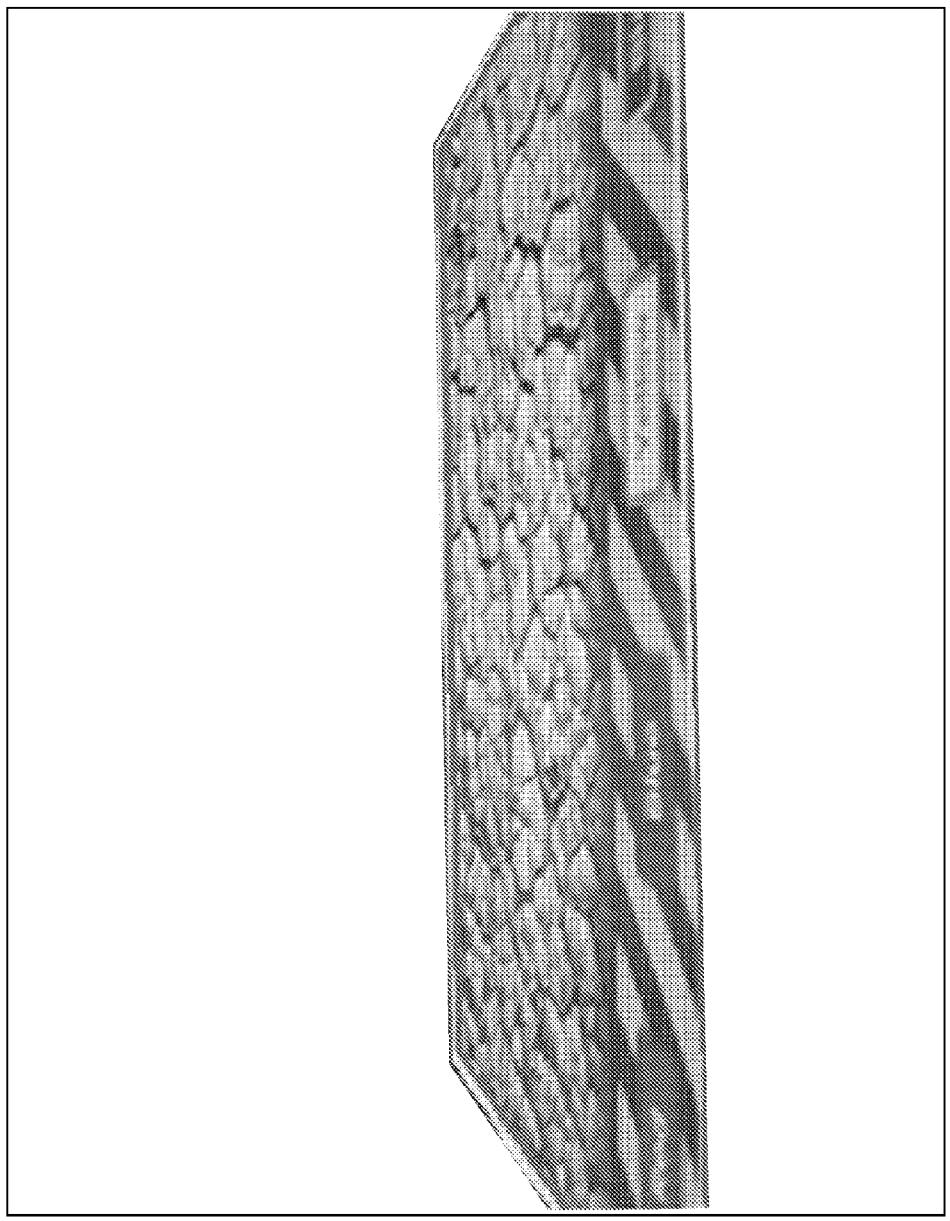

FIGS. 10-12 show a planar target 100 at various steep angles of incidence as viewed from a camera. In FIG. 10, a planar target 100 is viewed from a camera at an angle α of 60°. A system that has a dead angle of 60° detects keypoints 132 an acute angle α less than 60° of a planar target 100 to a camera but acute angles greater than 60° but less than 90° results in no or insignificant detection of keypoints 132. In FIG. 11, a planar target 100 is viewed from a camera at an acute angle α of 70°. In FIG. 12, a planar target 100 is viewed from a camera at an acute angle α of 77°.

Detection of keypoints 130 without embodiments described herein might operate at angles α as much as 60° to 65°. In some embodiments, improvements described herein allow for the detection of descriptors at angles α as steeps as 70° to 75°. That is, a database containing keypoints and descriptors for only non-warped views have a dead angle lower than a database containing keypoints and descriptors for warped views. Here, the view angle α between FIG. 10 and FIG. 11 differs by only 10°. A similar change by 10° in dead angle (from 60° to 70°) significantly decreases the angle where no detection is possible (from 30° to 20°), which is a improvement of 33%.

Figure 13:
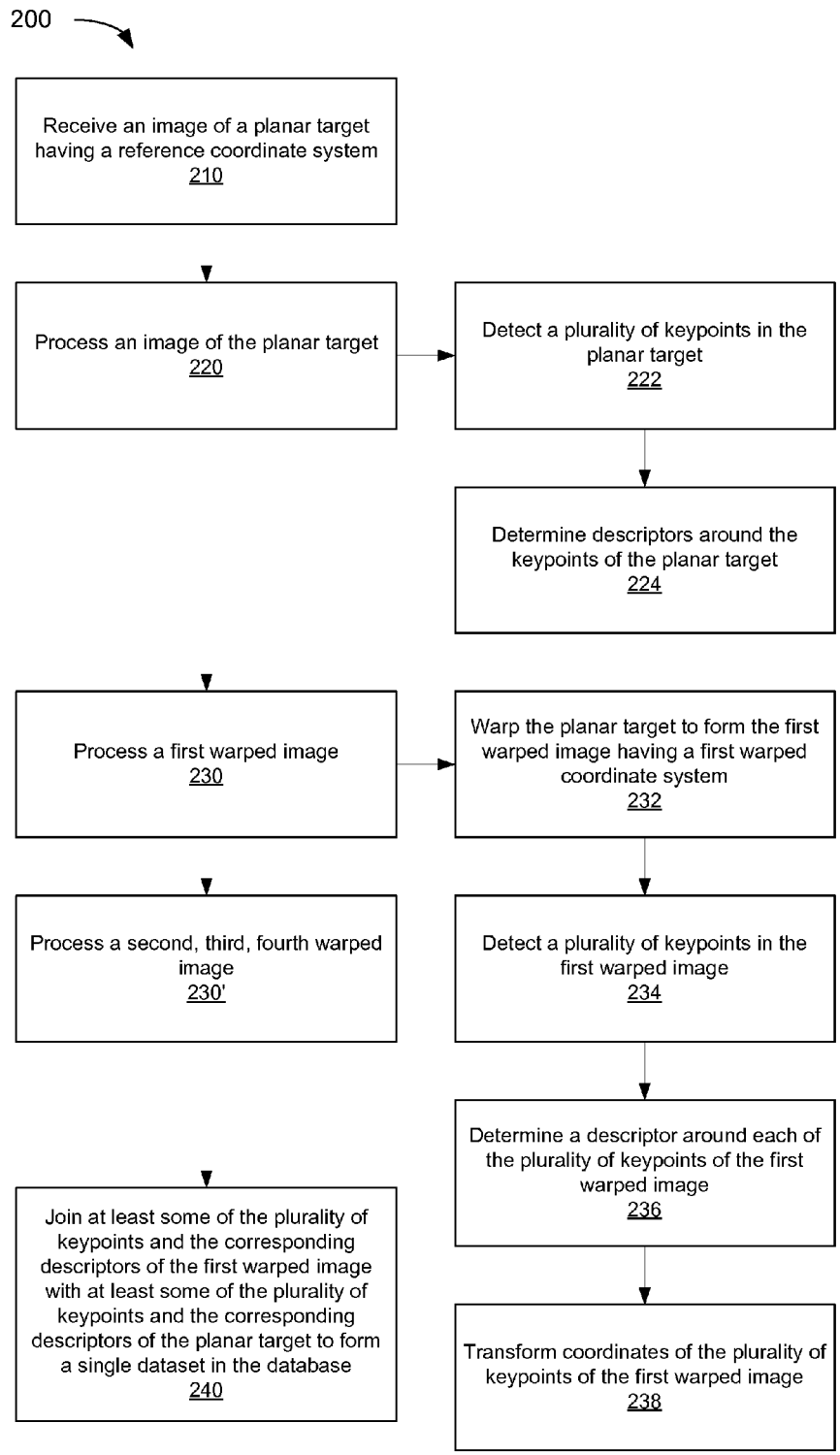
FIG. 13 illustrates a pre-processing method 200 to file a database for detecting a planar target 100, in accordance with some embodiments of the present invention.

FIG. 13 illustrates a pre-processing method 200 to file a database for detecting a planar target 100, in accordance with some embodiments of the present invention.

At 210, a processor, such as a server, receives an image of a planar target. Every point on the planar target is described by a reference coordinate system (e.g., {x,y}). The planar target is often square or rectangular but may also be another geometric shape (e.g., parallelogram, octagonal, round or oval) or free form (e.g., an outline of a cartoon figure).

At 220, the processor processes an image of planar target 100 to extract a set of keypoints and corresponding descriptors. In detail, processing begins at 222 and completes at 224.

At 222, the processor detects a plurality of keypoints 130 in the planar target 100. At this point, the plurality of keypoints 130 may be pruned to a smaller set of remaining keypoints 130 that are well and randomly distributed, to reduce memory and processing required.

At 224, the processor determines a descriptor around each of the (remaining) plurality of keypoints 130 in the planar target 100, thereby resulting in the plurality of keypoints 130 and corresponding descriptors of the image of the planar target 100. In some embodiments, the keypoints 130 may be further pruned based on keypoints 130 found in the warped images to result in a reduced number of keypoints 130. In some embodiments, keypoints are pruned before deriving descriptors for the keypoints. Alternatively, the keypoints are not pruned until all non-warped and warped images have been processed.

At 230, the processor processes a first warped image to extract another set of descriptors. In detail, processing begins at 232, continues to 234 and 246, and then completes at 238.

At 232, the processor warping or mathematically transforms the planar target to form the first warped image having a first warped coordinate system. For example, the planar target is rotated about the X-axis and/or the Y-axis and/or the Z-axis. The first warped image has a first warped coordinate system (e.g., {x',y'}) such that a point in first warped coordinate system may be converted to the reference coordinate system by a linear transform thereby reversing the effect of the axis rotation. A mathematical transform may be used to transform pixels of the image in the {x,y} coordinate system to pixels of the warped image in the {x',y'} coordinate system.

At 234, a processor detects a plurality of keypoints 132 (e.g., 132A) in the first warped image. Again, the keypoints 132 may be pruned to a set of remaining keypoints 132 to improve distribution and/or reduce memory and processing required.

At 236, the processor determines a descriptor around each of the (remaining) plurality of keypoints 132 of the first warped image, thereby resulting in the plurality of keypoints and corresponding descriptors of the first warped image.

At 238, the processor transforms coordinates of the plurality of keypoints 132 of the first warped image between the first warped coordinate system and the reference coordinate system As shown at 230', the processor may process a second, third, fourth or more warped images of the planar target in a similar manner (as described above with reference to 230-238). For example, the process repeats for a second, a third and a fourth image. The keypoints may be extracted from a non-warped image, a right-hand perspective image, a left-hand perspective image, an upward perspective warped image, and a downward perspective warped image. The processor may prune overlapping keypoints 130 and keypoints 132 from the various one or more warped images (first, second, third and/or fourth warped images) and non-warp planar target images.

The locations of the various keypoints 132 are converted to a common coordinate system, such as the reference coordinate system of the planar target. At 240, the processor joins at least some of the plurality of keypoints 130 and the corresponding descriptors of the first warped image with at least some of the plurality of keypoints 132 and the corresponding descriptors of the planar target to form a single dataset in the database for the image of the planar target.

The processor only needs to fill or supply keypoints and descriptors not pruned away by the pruning process. The pruning process, as known in the art, may remove keypoints 130 and keypoints 132 that do not provide a good distribution or are redundant. The processor then may save the un-pruned or remaining descriptors to the database indexed by each separate keypoint location. Therefore, a keypoint determined in one warped image that maps or transforms to a keypoint already determined in another warped image or determined in the top-down view of the planar target may be pruned away and ignored as redundant, for example, if the descriptors are identical or sufficiently similar.

The processor, such as in a server, acts as a means for receiving an image of a planar target, detecting keypoints 130, 132 in the images of the planar target, warping an image of the planar target to one or more warped images, determining keypoints and descriptors from the warped image(s), pruning keypoints, transforming between warped and non-warped coordinate systems, and loading, filling or supplying a database. From the mobile device's point of view during use, the mobile device is not able to tell if its database is filled only with a non-warped image, only with one or more warped images or a combination of a non-warped image and one or more warped images. That is, the database appears the same to the mobile device and runs the same algorithm with or without having warped image feature points in the database. With warped views, however, the mobile device will be able to detect descriptors of feature points at steeper angles.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method to create a database used for detecting a planar target, the method comprising:
   receiving an image of the planar target having a reference coordinate system;
   first processing the image of the planar target, wherein first processing comprises:
      detecting a plurality of keypoints in the planar target; and
      determining a descriptor around each of the plurality of keypoints in the planar target, thereby resulting in the plurality of keypoints and corresponding descriptors of the image of the planar target;
   second processing a first warped image, wherein second processing comprises:
      warping the planar target to form the first warped image having a first warped coordinate system;
      detecting a plurality of keypoints in the first warped image;
      determining a descriptor around each of the plurality of keypoints of the first warped image, thereby resulting in the plurality of keypoints and corresponding descriptors of the first warped image; and
      transforming coordinates of the plurality of keypoints of the first warped image between the first warped coordinate system and the reference coordinate system; and
   joining at least some of the plurality of keypoints and the corresponding descriptors of the first warped image with at least some of the plurality of keypoints and the corresponding descriptors of the planar target to form a single dataset in the database for the image of the planar target.

2. The method of claim 1, further comprising third processing one or more warped images, wherein third processing each particular warped image of the one or more warped images comprises:
   warping the planar target to form the particular warped image having a particular warped coordinate system;
   detecting a plurality of keypoints in the particular warped image;
   determining a descriptor around each of the plurality of keypoints of the particular warped image, thereby resulting in the plurality of keypoints and corresponding descriptors of the particular warped image; and
   transforming coordinates of the plurality of keypoints of the particular warped image between the particular warped coordinate system and the reference coordinate system;
   wherein joining further comprises joining at least some of the plurality of keypoints and the corresponding descriptors of each of the particular warped image of the one or more warped images to the single dataset in the database for the image of the planar target.

3. The method of claim 1, wherein warping the planar target comprises warping by an angle α between 5° and 35°.

4. The method of claim 1, wherein warping the planar target comprises warping by an angle α between 35° and 45°.

5. The method of claim 1, wherein warping the planar target comprises warping by an angle α between 45° and 55°.

6. The method of claim 1, wherein warping the planar target comprises warping by an angle α between 55° and 75°.

7. The method of claim 1, wherein joining comprises pruning at least some of the plurality of keypoints and the corresponding descriptors of the first warped image.

8. The method of claim 1, wherein warping comprises mathematically rotating the planar target about an axis.

9. The method of claim 1, wherein warping comprises affine warping that mathematically rotates the planar target using an orthographic projection.

10. The method of claim 1, wherein warping comprises rotating the planar target using a perspective projection.

11. A device to create a database for use by a mobile device to detect a planar target, the device comprising:
    a camera configured to capture an image having a reference coordinate system, wherein of the image contains the planar target;
    a processor coupled to the camera and configured to:
       process the image of the planar target, wherein the processor is configured to:
          detect a plurality of keypoints in the planar target; and
          determine a descriptor around each of the plurality of keypoints in the planar target, thereby resulting in the plurality of keypoints and corresponding descriptors of the image of the planar target;
       process a first warped image, wherein the processor is configured to:
          warp the planar target to form the first warped image having a first warped coordinate system;
          detect a plurality of keypoints in the first warped image;
          determine a descriptor around each of the plurality of keypoints of the first warped image, thereby resulting in the plurality of keypoints and corresponding descriptors of the first warped image; and
          transform coordinates of the plurality of keypoints of the first warped image between the first warped coordinate system and the reference coordinate system; and
       join at least some of the plurality of keypoints and the corresponding descriptors of the first warped image with at least some of the plurality of keypoints and the corresponding descriptors of the planar target to form a single dataset in the database for the image of the planar target.

12. The device of claim 11, wherein the processor is further configured to process one or more warped images, wherein the processor is configured to process each particular warped image of the one or more warped images by begin configured to:
    warp the planar target to form the particular warped image having a particular warped coordinate system;
    detect a plurality of keypoints in the particular warped image;
    determine a descriptor around each of the plurality of keypoints of the particular warped image, thereby resulting in the plurality of keypoints and corresponding descriptors of the particular warped image; and
    transform coordinates of the plurality of keypoints of the particular warped image between the particular warped coordinate system and the reference coordinate system;
    wherein the processor configured to join further comprises the processor configured to join at least some of the plurality of keypoints and the corresponding descriptors of each of the particular warped image of the one or more warped images to the single dataset in the database for the image of the planar target.

13. The device of claim 11, wherein the processor configured to join comprises the processor configured to prune at least some of the plurality of keypoints and the corresponding descriptors of the first warped image.

14. The device of claim 11, wherein the processor configured to warp comprises the processor configured to affine warp to mathematically rotate the planar target using an orthographic projection.

15. A device to create a database for use by a mobile device to detect a planar target, the device comprising:
- means for receiving an image of the planar target having a reference coordinate system;
- means for first processing the image of the planar target, wherein the means for first processing comprises:
  - means for detecting a plurality of keypoints in the planar target; and
  - means for determining a descriptor around each of the plurality of keypoints in the planar target, thereby resulting in the plurality of keypoints and corresponding descriptors of the image of the planar target;
- means for second processing a first warped image, wherein the means for second processing comprises:
  - means for warping the planar target to form the first warped image having a first warped coordinate system;
  - means for detecting a plurality of keypoints in the first warped image;
  - means for determining a descriptor around each of the plurality of keypoints of the first warped image, thereby resulting in the plurality of keypoints and corresponding descriptors of the first warped image; and
  - means for transforming coordinates of the plurality of keypoints of the first warped image between the first warped coordinate system and the reference coordinate system; and
- means for joining at least some of the plurality of keypoints and the corresponding descriptors of the first warped image with at least some of the plurality of keypoints and the corresponding descriptors of the planar target to form a single dataset in the database for the image of the planar target.

16. The device of claim 15, further comprising means for third processing one or more warped images, wherein the means for third processing each particular warped image of the one or more warped images comprises:
- means for warping the planar target to form the particular warped image having a particular warped coordinate system;
- means for detecting a plurality of keypoints in the particular warped image;
- means for determining a descriptor around each of the plurality of keypoints of the particular warped image, thereby resulting in the plurality of keypoints and corresponding descriptors of the particular warped image; and
- means for transforming coordinates of the plurality of keypoints of the particular warped image between the particular warped coordinate system and the reference coordinate system;
- wherein the means for joining further comprises means for joining at least some of the plurality of keypoints and the corresponding descriptors of each of the particular warped image of the one or more warped images to the single dataset in the database for the image of the planar target.

17. The device of claim 15, wherein the means for joining comprises means for pruning at least some of the plurality of keypoints and the corresponding descriptors of the first warped image.

18. The device of claim 15, wherein the means for warping comprises means for affine warping that mathematically rotates the planar target using an orthographic projection.

19. A non-transitory computer-readable storage medium including program code stored thereon for a device to create a database for use by a mobile device to detect a planar target, comprising program code to:
- receive an image of the planar target having a reference coordinate system;
- process the image of the planar target, wherein the program code to process comprises program code to:
  - detect a plurality of keypoints in the planar target; and
  - determine a descriptor around each of the plurality of keypoints in the planar target, thereby resulting in the plurality of keypoints and corresponding descriptors of the image of the planar target;
- process a first warped image, wherein the program code to process comprises program code to:
  - warp the planar target to form the first warped image having a first warped coordinate system;
  - detect a plurality of keypoints in the first warped image;
  - determine a descriptor around each of the plurality of keypoints of the first warped image, thereby resulting in the plurality of keypoints and corresponding descriptors of the first warped image; and
  - transform coordinates of the plurality of keypoints of the first warped image between the first warped coordinate system and the reference coordinate system; and
- join at least some of the plurality of keypoints and the corresponding descriptors of the first warped image with at least some of the plurality of keypoints and the corresponding descriptors of the planar target to form a single dataset in the database for the image of the planar target.

20. The non-transitory computer-readable storage medium of claim 19, wherein the program code further comprises program code to process one or more warped images, wherein each particular warped image of the one or more warped images comprises program code to:
- warp the planar target to form the particular warped image having a particular warped coordinate system;
- detect a plurality of keypoints in the particular warped image;
- determine a descriptor around each of the plurality of keypoints of the particular warped image, thereby resulting in the plurality of keypoints and corresponding descriptors of the particular warped image; and
- transform coordinates of the plurality of keypoints of the particular warped image between the particular warped coordinate system and the reference coordinate system;
- wherein the program code to join further comprises program code to join at least some of the plurality of keypoints and the corresponding descriptors of each of the particular warped image of the one or more warped images to the single dataset in the database for the image of the planar target.

21. The non-transitory computer-readable storage medium of claim 19, wherein the program code to join comprises program code to prune at least some of the plurality of keypoints and the corresponding descriptors of the first warped image.

22. The non-transitory computer-readable storage medium of claim 19, wherein the program code to warp comprises program code to affine warp to mathematically rotate the planar target using an orthographic projection.

23. A method in a mobile device for detecting a planar target, the method comprising:
- capturing an image of the planar target at an acute angle to form a captured image, wherein the acute angle is measured from a perpendicular line from a plane of the planar target;
- detecting a plurality of keypoints from the captured image;
- determining a descriptor around each of the plurality of keypoints, thereby forming a plurality of descriptors from the captured image;
- comparing the plurality of descriptors from the captured image to a database containing a plurality of descriptors for at least one warped image of a non-warped image to result in a comparison; and
- recognizing the planar target from the comparison.

24. The method of claim 23, wherein the acute angle is between 65° and 70°.

25. The method of claim 23, wherein the acute angle is between 70° and 75°.

26. The method of claim 23, wherein the database contains a plurality of descriptors for the non-warped image and for the at least one warped image of the non-warped image.

27. The method of claim 23, wherein the at least one warped image comprises a plurality of warped images of the non-warped image.

28. The method of claim 23, wherein the plurality of descriptors for the at least one warped image comprises a pruned set of descriptors.

29. The method of claim 23, wherein the at least one warped image comprises an affine warped image that is a mathematically rotated view of the planar target using an orthographic projection.

30. The method of claim 23, wherein the at least one warped image comprises at least one warped image warped by an angle $\alpha$ between 5° and 35°.

31. The method of claim 23, wherein the at least one warped image comprises a warped image warped by an angle $\alpha$ between 35° and 45°.

32. The method of claim 23, wherein the at least one warped image comprises a warped image warped by an angle $\alpha$ between 45° and 75°.

33. A mobile device for detecting a planar target, the mobile device comprising:
- means for capturing an image of the planar target at an acute angle to form a captured image, wherein the acute angle is measured from a perpendicular line from a plane of the planar target;
- means for detecting a plurality of keypoints from the captured image;
- means for determining a descriptor around each of the plurality of keypoints, thereby forming a plurality of descriptors from the captured image;
- means for comparing the plurality of descriptors from the captured image to a database containing a plurality of descriptors for at least one warped image of a non-warped image to result in a comparison; and
- means for recognizing the planar target from the comparison.

34. The mobile device of claim 33, wherein the acute angle is between 65° and 70°.

35. The mobile device of claim 33, wherein the acute angle is between 70° and 75°.

36. A mobile device for detecting a planar target, the mobile device comprising:
- a camera for capturing an image of the planar target at an acute angle to form a captured image, wherein the acute angle is measured from a perpendicular line from a plane of the planar target;
- a receiver configured to receive a database containing a plurality of descriptors for at least one warped image of a non-warped image;
- a processor coupled to the camera and to the receiver and configured to:
  - detect a plurality of keypoints from the captured image;
  - determine a descriptor around each of the plurality of keypoints, thereby forming a plurality of descriptors from the captured image;
  - compare the plurality of descriptors from the captured image to the database to result in a comparison; and
  - recognize the planar target from the comparison.

37. The mobile device of claim 36, wherein the acute angle is between 65° and 70°.

38. The mobile device of claim 36, wherein the acute angle is between 70° and 75°.

* * * * *